March 17, 1936.  H. B. NELSON  2,034,198
INTERNAL COMBUSTION ENGINE
Filed Dec. 28, 1934
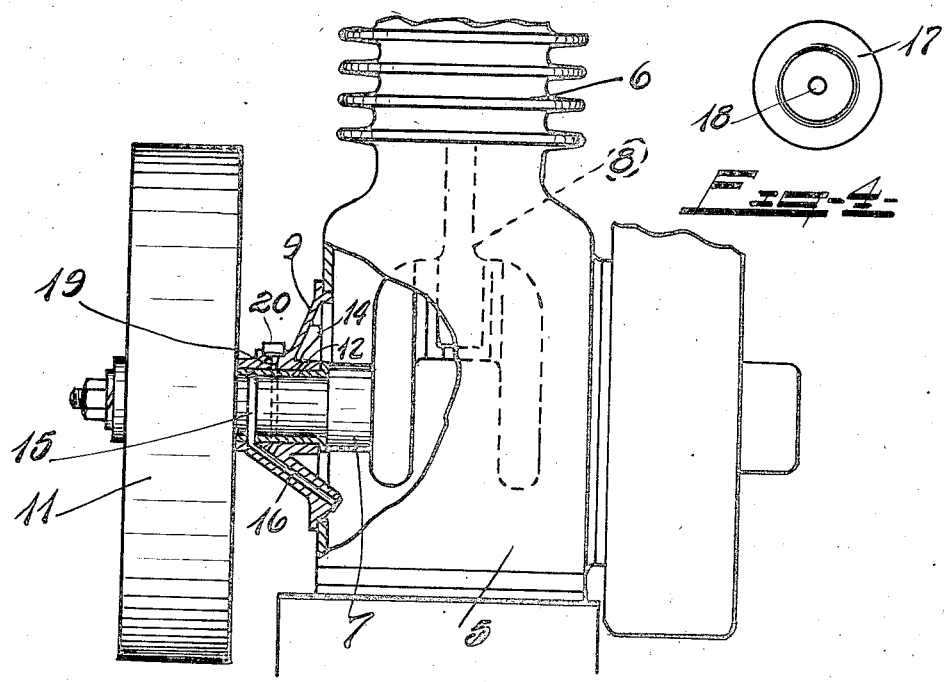
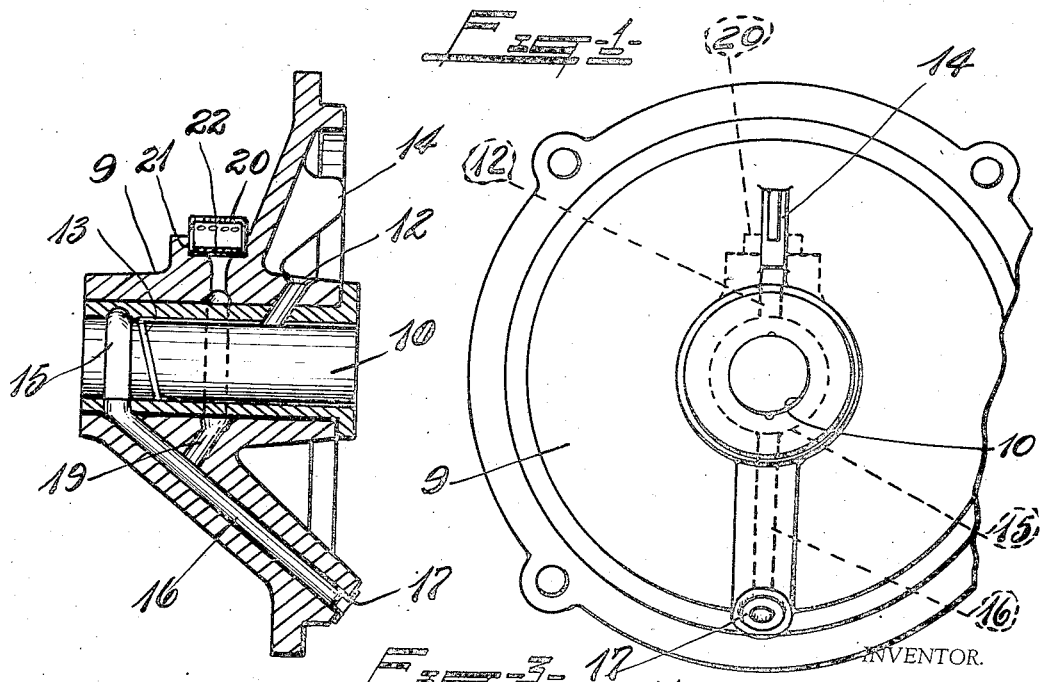
INVENTOR.
BY Harry B. Nelson.
Frank C. Seaman.
ATTORNEY.

Patented Mar. 17, 1936

2,034,198

UNITED STATES PATENT OFFICE 2,034,198

INTERNAL COMBUSTION ENGINE

Harry B. Nelson, Saginaw, Mich., assignor to Nelson Brothers Company, Saginaw, Mich., a corporation of Michigan Application December 28, 1934, Serial No. 759,443

8 Claims. (Cl. 184—6)

This invention relates to internal combustion engines, and more particularly to the crank shaft bearings and the means for lubrication thereof.

In internal combustion engines the pressure pulsations within the crank case, due to the movement of the piston, force jets of air through the clearance space of the crank shaft bearings which forces the oil out of the crank case, with the subsequent damage to surrounding mechanism and the waste of the oil supply prematurely, and consequently a suitable arrangement must be made to collect and retain the oil which seeps from the bearing.

One of the prime objects of the invention is to provide means for trapping the oil which is forced outwardly by reason of these pressure pulsations, and provide a return channel or duct with a constricted outlet, so that the oil collected by the bearing groove may be continuously returned to the crank case.

Another object is to provide simple and practical means for returning the oil which is forced outwardly through the bearing clearances of the crank case, and for collecting oil fog and fine particles so that there will be no wastage or dissipation of the oil supply.

A more specific object of the invention resides in the provision of a bearing formed with an inclined return channel or duct having a by-pass opening thereinto so that the pressure in the duct, and which is produced by the pressure pulsations of the engine, will be materially lessened and minimized to the extent that it will not prevent the return flow of the excess oil to the crank case or the oil drippage from the by-pass to the return duct.

With the above and other objects in view, the invention consists in the combination and arrangement of parts, hereinafter more fully described, illustrated in the accompanying drawing, and particularly pointed out in the appended claims, it being understood that changes may be made in the form, size, proportion, and minor details of construction, without departing from the spirit, or sacrificing any of the advantages of the invention.

In the drawing—

Fig. 1 is a fragmentary side view of a single cylinder internal combustion engine with parts broken away and in section to illustrate the invention.

Fig. 2 is an enlarged sectional side view showing one of the crank case side plates, and illustrating the return duct and by-pass.

Fig. 3 is a fragmentary end view of the crank case side plate.

Fig. 4 is a plan view of the duct cap.

Referring now more particularly to the accompanying drawing in which I have shown one embodiment of my invention, the numeral 5 represents the crank case of a single cylinder internal combustion engine; this includes a cylinder 6 in which a piston (not shown) is mounted, and which is connected to a crank shaft 7 by means of a connecting rod 8 as usual. Side plates 9 are secured to the sides of the crank case by means of bolts (not shown), and bearings 10 are provided therein, the crank shaft 7 being journaled in said bearings, and a flywheel 11 is mounted on said shaft as usual.

The crank case is adapted to be filled with oil or other lubricant, which is conducted to the bearings 10 in the conventional manner, and enters the clearance between its bore and the shaft through the inlet passage 12, which communicates with oil grooves 13 provided as shown, a drip rib 14 being formed on said flange directly above said recess.

An annular groove 15 is formed in the outer end of the bearing in communication with its bore, and this groove communicates with an inclined return channel or duct 16 which leads downwardly to return the oil from the bearing groove 15 to the crank case, the inner discharge end of the duct 16 being adapted to receive a duct cap 17 having a centrally disposed constricted opening 18 therein and through which oil is returned to the crank case.

A by-pass 19 opens into the return duct 16 at a point intermediate its length, leading upwardly around the bearing and terminating in a breather 20 which is mounted in a suitable recess 21 provided in the crank case side plate, a very fine screen or similar fabric 22 being provided in the breather over the by-pass outlet, so that fine oil fog or particles of lubricant forced through the by-pass by the pressure pulsations will be collected on said screen and drip back into the by-pass and thence into the return duct to be returned to the crank case. The area of the upper end of the return duct and by-pass, which is open to the atmosphere, in ratio to the constricted opening in the duct cap, so reduces the outward pressure in the return duct that no oil is forced outwardly and out of the bearing, and the returning oil drips into the crank case at the interval between each pressure pulsation.

In operation the device is simple and practical. When the engine is operating, the pressure pulsations within the crank case force the oil outwardly through the bearing clearances and grooves 13 to the annular groove 15, the excess oil entering said annular groove and flowing into the downwardly inclined return duct 16, thence through the duct cap 17, dripping into the crank case through the opening 18.

The downstroke of the engine piston, of course, creates a pressure in the crank case, but inasmuch as the duct opening 18 is of limited area in comparison to the duct 16, and the fact that the by-pass 19 opens to the atmosphere, it will be obvious that the pressure within the return duct will be materially lessened and minimized, and that it will not prevent the downward flow of lubricant in the duct. It, therefore, follows that on the upstroke of the piston a suction is created in the crank case, and this suction permits and assists the return flow of oil from the return duct into the crank case.

The return duct can be readily cleaned if required, and while in the present instance I have shown a metal cap fitted in said duct, it will be readily understood that any other desirable means may be used for limiting the size of said opening.

From the foregoing description it will be obvious that I have perfected a very simple, practical, and economical means for preventing oil being blown out of the bearings of internal combustion engines, and for returning excess oil from the outer portion of the bearings to the engine crank case.

What I claim is:

1. In an internal combustion engine including a crank case, a crank shaft, a bearing for the shaft, means for preventing lubricant from being forced out of said bearing, and including means for returning lubricant from the outer end of the bearing to the crank case, and means open to the atmosphere for limiting the pressure in the lubricant returning means.

2. In combination with the crank case of an internal combustion engine, a crank shaft, a bearing for the shaft and adapted to receive oil from the crank case, a reciprocating piston producing pressure pulsations within the crank case, means for preventing said pressure pulsations from forcing oil out of the bearing, and including a duct between the outer end of the bearing and the crank case for returning oil from the bearing to said crank case means for constricting the discharge opening in said duct, and means for releasing the pressure built up in the return duct by said pressure pulsations.

3. In combination with a closed chamber adapted to contain a lubricant and subject to pressure pulsations, a bearing communicating with said chamber, a shaft journaled in the bearing, said bearing being lubricated from said lubricant chamber, and means for preventing the pressure within the chamber from forcing the lubricant out of the bearing, including means for returning the lubricant from the outer portion of the bearing to the chamber, said means including a by-pass communicating with said return duct and open to the atmosphere.

4. In combination with the crank case, an internal combustion engine having a piston and adapted to contain a lubricant, a shaft, a bearing mounted in the wall of the crank case and in which the shaft is journaled, and in which the clearance between the bearing bore and the shaft is in communication with the interior of the crank case, means for preventing pressure within the crank case from forcing lubricant out of the bearing, and comprising a downwardly disposed return duct communicating with the bearing, and a by-pass duct communicating with the downwardly disposed duct and the atmosphere.

5. In combination with the crank case of an internal combustion engine in which pressure pulsations are produced by the piston of the engine, a shaft, a bearing for the shaft communicating with the interior of the crank case, said bearing being supplied with lubricant from the crank case and provided with a collector groove in its outer end portion, and a lubricant return passage communicating the collector groove with the crank case, means for limiting the area of the inner end of said return passage, and a by-pass communicating with said return passage and open to the atmosphere.

6. In an internal combustion engine including a crank case, a crank shaft, a bearing for the shaft, means for preventing lubricant being forced out of said bearing and including a return duct open to the bearing and to the crank case respectively, a breather, and a by-pass communicating with said return duct and breather respectively.

7. In an internal combustion engine including a crank case, a crank shaft, a bearing for the shaft, means for preventing lubricant being forced out of said shaft and including a downwardly disposed return duct connected to the outer end of the bearing and open to the crank case, a by-pass communicating with said duct at a point intermediate its length, and means forming a closure for the open end of the by-pass for collecting oil spray and returning it to said by-pass.

8. In combination with a closed chamber adapted to contain a lubricant and subject to pressure pulsations, a bearing communicating with both the interior and exterior of the crank case, a shaft journaled in the bearing, said bearing being lubricated from said lubricant chamber, means for preventing the pressure within the chamber from forcing the lubricant out of the bearing, including means for returning the lubricant from the outer portion of the bearing to the chamber, said means including a by-pass communicating with the lubricant returning means, a perforated breather member forming a closure for the open end of the by-pass, and means in said breather for condensing and collecting oil spray and particles blown through the by-pass.

HARRY B. NELSON.